H. A. HUNTER.
POLE AND SHAFTS.
APPLICATION FILED MAR. 23, 1911.
1,022,555.
Patented Apr. 9, 1912.
2 SHEETS—SHEET 1.
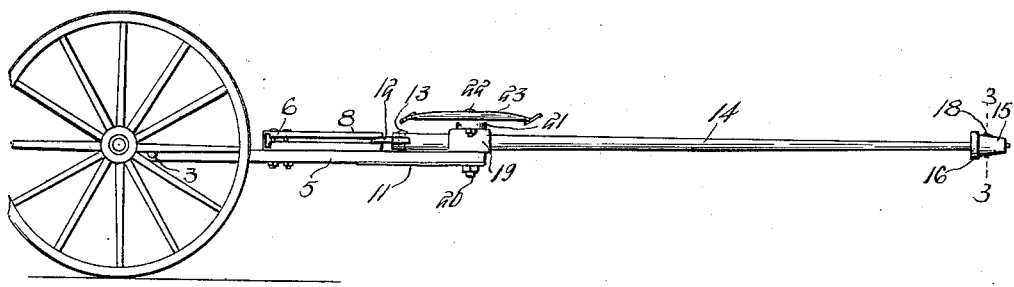
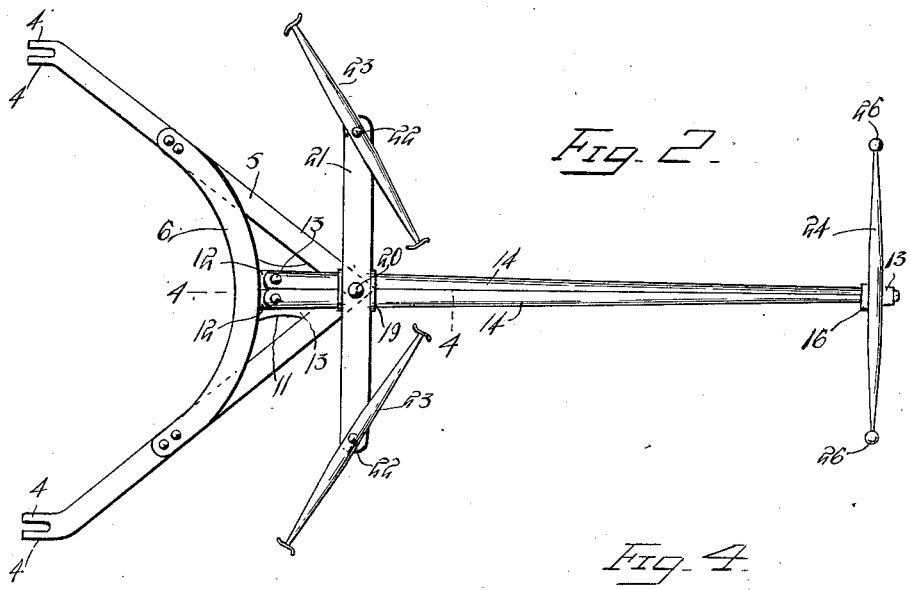
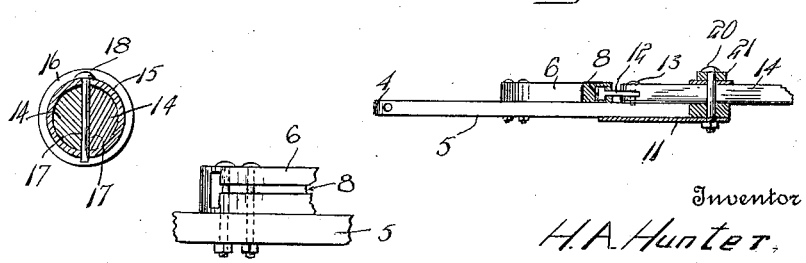
Witnesses
J. C. Simpson
N. L. Neal
Inventor
H. A. Hunter,
By Harry Ellis Chandlee,
Attorney H. A. HUNTER.
POLE AND SHAFTS.
APPLICATION FILED MAR. 23, 1911.
1,022,555.
Patented Apr. 9, 1912.
2 SHEETS—SHEET 2.
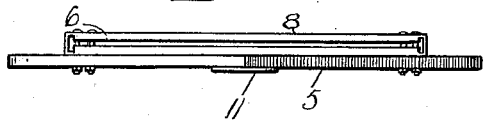
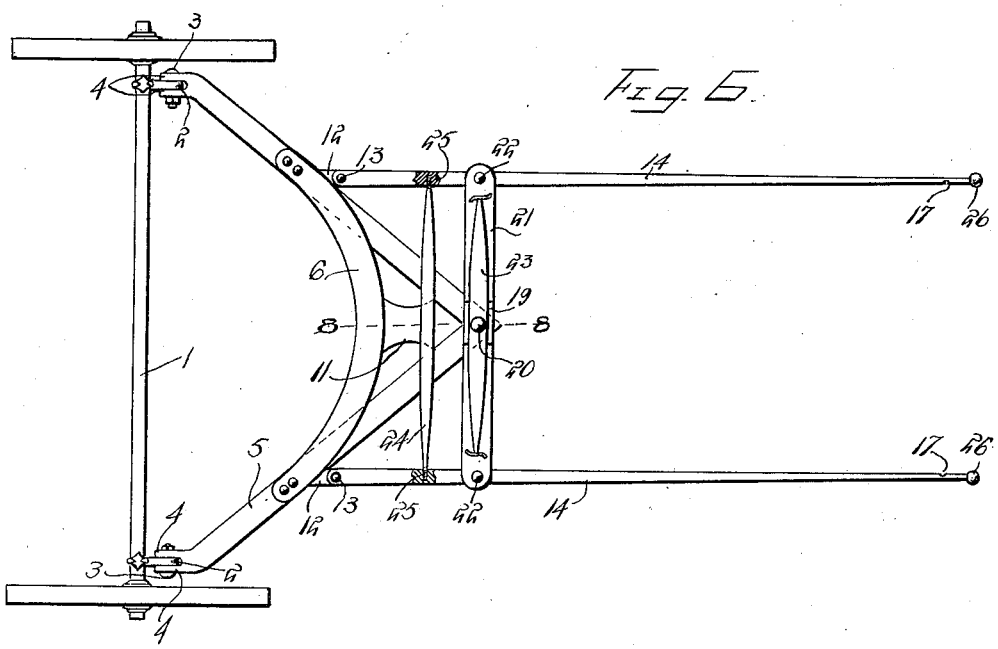
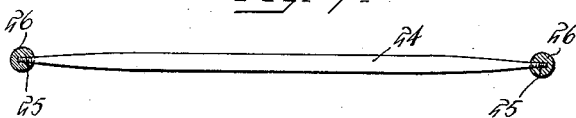
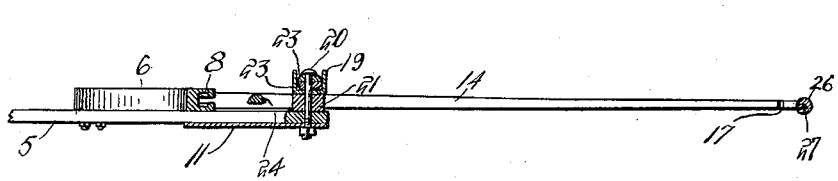
Witnesses
J. C. Simpson
M. L. Neal
Inventor
H. A. Hunter
By Harry Ellis Chandlee
Attorney
COLUMBIA PLANOGRAPH CO., WASHINGTON, D. C.

UNITED STATES PATENT OFFICE.

HARRISON A. HUNTER, OF MANKATO, KANSAS.

POLE AND SHAFTS.

1,022,555.   Specification of Letters Patent.   Patented Apr. 9, 1912.

Application filed March 23, 1911. Serial No. 616,317.

*To all whom it may concern:*

Be it known that I, HARRISON A. HUNTER, a citizen of the United States, residing at Mankato, in the county of Jewell and State of Kansas, have invented certain new and useful Improvements in Poles and Shafts, of which the following is a specification.

My invention relates to improvements in poles and shafts and has for its leading object the provision of an improved attachment for the running gear of vehicles which is adapted for use either as a pole or tongue for the vehicle when two horses are employed to draw the same, or as shafts for the vehicles when but a single horse is employed to draw the same.

Another object of the invention is the provision of an improved combination shaft and tongue for vehicles in which the doubletrees, neck-yoke and other parts employed with the device when used as a tongue will perform the functions of braces and trees when the device is used as shafts, whereby all the parts except the tongue cap plate will be present and in use when the device is employed as either tongue or shafts.

A further object of my invention is the provision of a simple and inexpensive attachment for vehicles which can be quickly and easily adjusted to transform the vehicle from a one-horse to a two-horse drawn vehicle or vice versa.

Other objects and advantages of my invention will be apparent from the following description taken in connection with the accompanying drawings, and it will also be understod that I may make any changes in construction within the scope of my claims without departing from or exceeding the spirit of the invention.

Figure 1 represents a side elevation of a vehicle with my device applied thereto. Fig. 2 represents a top plan view of my device as it appears when used as a tongue or carriage pole. Fig. 3 represents a cross sectional view of the end of the pole and cap therefor on the line 3—3 of Fig. 1. Fig. 4 represents a fragmentary longitudinal sectional view on the line 4—4 of Fig. 2. Fig. 5 represents a front view of the yoke which is secured to the axle with the pole removed. Fig. 6 represents a top plan view of the device when used to form shafts for the vehicle. Fig. 7 represents a longitudinal sectional view of the neck yoke bar. Fig. 8 represents a fragmentary sectional view on the line 8—8 of Fig. 6, and Fig. 9 represents a fragmentary view of the slotted block and plate supporting the same.

In the drawings, the numeral 1 designates the front axle having the ears 2 to which are pivotally secured by the bolts 3 the bifurcated ends 4 of the V-shaped member 5 having secured thereto the curved block 6 having the longitudinally extending slot 8 formed therein of key-hole shape in cross section, the rear ends of said slot being open. Secured to the under side of the plate 5 at its front vertex is the brace 11.

When it is desired to employ my device to form the pole or tongue of the vehicle, I engage in the slot 8 the T-shaped plates 12 secured by the bolts 13 to the larger rear end of the half round slightly tapering bars 14 which may be formed of hickory or other wood or of metal tubing. Mounted on the outer ends of said bars 14 is the circular metal cap 15 having a flange 16 formed thereon to engage the neck yoke center. Passing through the cap 15 and engaged in recesses 17 in the ends of the bars 14 is the securing screw 18.

To retain the inner portions of the bars 14 together I employ the U-plate 19 which is inverted to fit down over the bars 14, while projecting upward from the apex of the plate 5 between said bars and through the U-plate is the pivot bolt 20 having engaged on its upper end the bar 21 providing the double-tree for the vehicle, while pivotally secured by the bolt 22 to each end of the double tree is a half round swingle tree 23 having its central portion of approximately the same radius as the larger end of the bar 14.

From the foregoing description taken in connection with the drawings, it will be seen that I have provided a vehicle pole or tongue formed from a pair of bars removably attached to the yoke plate 5 and suitably held in engagement with each other at their inner and outer ends, while engaging the flange 16 is the neck yoke bar 24 having the threaded ends 25 on which are engaged the metal balls 26.

When it is desired to change my device to cause the same to provide shafts for the vehicle I remove the cap 15 from the ends of the bars 14 and also remove the double tree, the bolt 20, and plate 19. The bars 14 are now entirely free of each other and may be laterally shifted in the slot 8. I then remove the balls 26 from the ends of the neck-yoke bar and screw said threaded ends 25 of the bar into the rear portion of the bars 14 to serve as a brace to retain the same in spaced relation to prevent either inward or outward movement thereof. To further brace said bars, I remove the swingle tree 23 from the ends of the double tree 21 and resecure the double tree to the plate 5 by the bolt 20 and pass the bolts 22 through the ends of the bar 21 to secure the bar 21 to the bars 14. The plate 19 is reversed and turned at right angles to its former position and rests on the bar 21, while engaged between the arms of said plate 19 are the pair of swingle trees 23 which together form a swingle tree for the vehicle, the bolt 20 passing through the openings in which the bolts 22 were formally engaged to pivotally secure the swingle trees in position. It will thus be seen that all of the parts with the exception of the cap plate 15 are utilized both when the device is employed as a tongue and when its component parts form shafts, the shaft bars 14 having their ends 27 threaded to receive the balls 26 when said balls are unscrewed from the neck yoke bar 24.

From the foregoing description taken in connection with the drawings the construction of my improvement in combined tongue and shaft for vehicles will be readily understood, and it will be seen that I have provided a simple, durable, efficient, practical, and highly desirable device of this character which can be quickly and readily changed from one form to the other and which will be securely held in either adjusted position.

I claim:

1. The combination with a vehicle, of a yoke member pivoted to the axle thereof, a slotted block secured to said yoke member, a pair of bars each having a T-plate secured to one end thereof for engagement in the slot in the blocks, a cap mounted on the outer ends of the bars for securing the same together, a U-plate engaging the inner ends of the bars for retaining them in engagement, a double tree pivotally supported by the yoke member above the pair of bars, and half round swingle trees pivotally secured to the outer ends of the double tree.

2. An attachment for vehicles, comprising a yoke member pivotally secured to the axle of the vehicle, a longitudinally slotted block secured to the yoke, half round bars having T-plates secured to their ends, said plates being engaged in the slot, a brace bar having threaded ends engaged in the half round bars and connecting the same, a cross bar secured to the yoke, bolts securing the ends of the cross bar to the half round bars, said bars having threaded ends of the same diameter as the threaded ends of the brace bar, a U-plate pivotally supported above the cross bar, and a pair of half round members mounted in the U-plate and together forming a swingle tree.

3. An attachment for vehicles, comprising a yoke member pivotally secured to the front axle, a slotted block secured to the yoke member, half round bars having T-plates secured on their ends, said plates when engaging in the slot of the block holding the bars spaced to provide shafts, said bars having outer threaded ends, a yoke bar having threaded ends of the same diameter as the ends of the half round bars, said yoke bar forming a brace for the shafts and a neck yoke when the shafts are united to provide a tongue, balls adapted to be engaged on the ends of the shafts or the ends of the yoke bar when used as a neck yoke, a cross bar providing a double tree for the tongue or a brace for the shafts, and half round swingle trees adapted to be pivotally supported above the cross bar to form together a unitary swingle tree for the shafts or separate swingle trees for the tongue.

4. The combination with a vehicle of convertible shaft and pole members therefor, comprising a slotted block supported by the axle of the vehicle, a pair of half round bars having T-shaped plates secured to one end, said bars having their other ends reduced and threaded, a bar having threaded ends of the same diameter as the ends of the half round bars, a cross bar, and a pair of half round swingle trees, whereby the bars form shafts braced by the cross bar and the bar having the threaded ends when the T-plates are engaged in the slotted block and the swingle trees together form a swingle tree, and the bars together form a wagon pole when the T-plates are engaged in the center of the slot, the cross bar forming a double tree to bear the swingle trees, and the bar having the threaded ends forming a neck yoke, and balls having internally threaded sockets for engagement upon appropriate exposed threaded ends of the different bars.

In testimony whereof I affix my signature, in the presence of two witnesses.

HARRISON A. HUNTER.

Witnesses:
JOHN B. ROBINSON,
CLAUD W. BROWN.